Patented Oct. 2, 1928.

1,686,183

UNITED STATES PATENT OFFICE.

WALTER O. SNELLING, OF ALLENTOWN, PENNSYLVANIA.

CURRENT-RECTIFYING DEVICE.

No Drawing.    Application filed February 14, 1923.   Serial No. 619,033.

My invention relates to current rectifying devices of the general nature of natural crystal detectors, and more particularly relates to improvements in contact rectifiers, electric valves, contact detectors and like devices having the property of detecting electromagnetic waves, and of modifying the currents set up by ether waves or other radiant energy.

It has long been known that the electrical conductivity of certain natural minerals varies with the direction in which the electrical current passes through the mineral, and with the intensity and duration of the applied electro-motive force. This property has been referred to as "uni-directional" conductivity, but may be more properly called selective conductivity or valve action, since in many cases the selective action made use of in the detection of radiant energy is not the directional factor at all, but is rather the variation in response of the contact element to changes in the intensity of the applied electrical pressure.

The fact that many natural minerals show selective electrical conductivity has caused efforts to be made to prepare synthetic products having the same effect. On preparing the corresponding sulfides, selenides, tellurides and arsenides of metals known to possess current rectifying properties as the naturally occurring crystals, by fusing together the metal and an element of the sulfur-group, products have been obtained which possess fair rectifying properties. It is known, for example, that by melting together a mixture of lead and sulfur to form lead sulfide, the fusion mass obtained possesses current rectifying properties which are approximately equal to the current rectifying properties of natual galena.

Efforts up to this time to produce current rectifying bodies by the wet precipitation of the sulfides, selenides, tellurides and arsenides of metals have not been so successful however, and although the sulfides of several metals, prepared by the precipitation of solutions of salts of the metal by means of hydrogen sulfide have given products of slight rectifying property, in no case has an artificial product produced by a wet reaction possessed sufficient sensitiveness to be of commercial importance.

I have discovered a procedure by means of which contact rectifying products may be obtained by wet precipitation methods, my product possessing greatly improved sensitiveness and selectivity. The products obtained by the practice of my new invention are not only greatly superior to the products previously obtained by wet precipitation methods, but in many cases are superior to the corresponding natural minerals.

In my Patent No. 1,638,278, August 9, 1927, of which the present application is a continuation in part, I have described a means for improving the current rectifying properties of precipitated or finely divided chemical bodies corresponding in composition to minerals having current rectifying ability, by the process which comprises compressing such finely divided chemical materials and heating the compressed product to a temperature sufficient to produce consolidation of the material, but insufficient to produce complete fusion.

I have now discovered an improved means of bringing about the consolidation and sensitization or activation of compounds of a metal and an element of the sulfur group, with the production of rectifying bodies of high efficiency and of marked sensitiveness as detectors of electromagnetic oscillations.

As an example of my present invention, I will describe a method which I may employ in the preparation of current modifying devices of great effectiveness. Using as my raw material ordinary commercial lead sulfide, which offers advantages as to availability and cheapness, I first compress the finely divided material into pellets or blocks by means of sufficient pressure to produce a coherent product. These pellets or blocks possess slight rectifying ability, but this current rectifying ability is entirely too slight in extent to make the product commercially useful. By heating these pellets or blocks at a temperature of about 900° C. for a few minutes in an atmosphere of sulfur vapor, I find that a very remarkable change occurs in the physical nature of the material, and in its current modifying characteristics. and as a result of the treatment described, the compressed pellets or blocks become so changed in physical nature as to possess very high current rectifying ability.

In the practice of my invention I prefer to heat my blocks or pellets of compressed material in a closed chamber containing sulfur vapor, preferably maintaining meanwhile superatmospheric pressure within the chamber. A pressure of two or more atmospheres within the chamber is desirable although not necessary. The essential feature of my invention is the exposure of a compound such as lead sulfide to the vapor of an element of the sulfur group, maintaining meanwhile a temperature in excess of the boiling point of the reagent used, but a temperature lower than the melting point of the compound.

The time and temperature of heating may desirably be modified in accordance with the nature of the compound used, and the degree of sensitivity desired in the final product. Using commercial precipitated lead-sulfide as my raw material, and sulfur as my other component, I find that heating to a red heat for one or two minutes while maintaining a pressure of about two atmospheres, gives desirable results. By employing lead sulfide as my raw material and selenium as my vaporized reagent, I have obtained excellent result by employing atmospheric pressure, a time of treatment of one minute and heating to medium redness.

Although I have referred specifically to lead sulfide as the pulverulent or finely divided compound which I prefer to use, my invention is by no means restricted to the use of this material. By employing other compounds, practicularly bismuth sulfide and molybdenum sulfide, it is also possible to obtain products possessing good rectifying characteristics by the practice of my invention, and in general I have found that the current rectifying characteristics of compounds which possess inherent feeble current rectifying properties may be greatly improved by exposure to the vapor of a suitable element of the sulfur group at a temperature above the boiling point of the reagent, but below the fusing point of the compound involved.

I do not know the nature of the change which occurs as the result of the application of my invention. Using compounds which already possess sufficient non-metallic component to fully satisfy the chemical affinity of the metal component, there would not appear to be any reason why heating in an excess of the vapor of the same substance should bring about any change. I find however, that under these conditions a change does occur, and this change manifests itself by striking improvement in the current rectifying characteristics of the material. I think that it is likely that, at the temperature employed and in the presence of a large excess of the non-metallic component in the vapor phase, there occurs some form of molecular change and ionic rearrangement in the compound, the excess of the non-metallic component at the temperature employed permitting some form of freedom of ionic movement within the structural ionic lattice making up the molecular complex.

I do not find that it is necessary to employ the same non-metallic element in my vapor phase reaction that is present in my new compound. I have obtained, for example products of extremely high sensitiveness by exposing compressed tablets of precipitated lead sulfide to an atmosphere of vaporized selenium at a temperature somewhat above red heat, but in this and similiar cases it is probable that the molecular and ionic rearrangement of the primary component is complicated by chemical changes, and the partial replacement of one element of the sulfur group by another element of the sulfur group.

In the preferred form of my invention I find it advantageous to apply the principles of my copending applications S. N. 615,160, filed January 26, 1923; S. N. 617,173, filed February 5, 1923, and Patent No. 1,638,278, August 9, 1927, in conjunction with my present procedure. As an example of a procedure which I find gives products of excellent current rectifying characteristics, I may take a mixture of 70 parts by weight of dry, finely divided precipitated lead sulfide and 30 parts by weight of flowers of sulfur. I mix these two components together until thorough incorporation is obtained. It is desirable that, before mixing, each of the components should be passed through a sieve having openings .125 mm. square (corresponding to 120 mesh to the linear inch). The mixture of the thoroughly incorporated components is next compressed into blocks or pellets of any desired size by means of a suitable hand or mechanical press, the porosity of the finished product being capable of control by the degree of pressure applied in this step of the operation. I find it desirable to use a sufficiently high pressure to give a pellet or block of firm and tough consistency, which should preferably be so hard as to only be capable of being scratched with difficulty by the finger nail. The use of very high pressure in the compressing operation is advantageous. The next step in my operation is to gradually heat the pellets or blocks so made to drive out the excess of sulfur and leave a porous mass having the general form of the block or pellet as originally shaped. I next expose these porous blocks or pellets to vapor of an element of the sulfur group such as sulfur or selenium at a red heat, a period of heating of from one to two minutes being sufficient. The product obtained by the procedure described possesses excellent current rectifying characteristics, and may be used instead of natural crystals of galena, molybdenite and like current rectifying minerals, in apparatus for measuring very minute alternating currents, for detecting radio signals, for rectifying electrical oscillations, and for many other purposes.

It will be evident that a wide range of equivalents may be used without departing from the spirit of my invention as herein disclosed. Instead of a precipitated metal sulfide I may employ a precipitated selenide or telluride, or I may employ a finely pulverized compound made by any other means than precipitation, as for example I may even use lead sulfide obtained by grinding natural galena to a fine powder. It is well known that not all galena possesses high current rectifying characteristics, but I have discovered that even galena of poor current rectifying characteristics may be used as raw material in the preparation of pellets of excellent rectifying characteristics, by first pulverizing the galena to a very fine powder, and then treating it in accordance with my present invention.

I find that certain impurities present in new compounds act advantageously in increasing the sensitiveness of the final current modifying elements, small amounts of bismuth sulfide serving to activate or increase the sensitiveness of lead sulfide, and small amounts of lead sulfide serving to activate molybdenum sulfide. Very small amounts of alkali earth sulfides, and particularly the sulfides of calcium and strontium, also serve as activators of the sensitiveness of current modifying elements, but the use of such activators does not form part of the present invention, although such compounds may be used in conjunction with the method of treatment herein described. It should also be noted that just as the presence of more than one metal often improves the current rectifying properties of a current-rectifying compound, so the presence of more than one element of the sulfur group is also frequently advantageous, and instead of exposing a contact detector compound to the vapor of a single element of the sulfur group, I sometimes find it desirable to employ the mixed vapors of more than one element of the sulfur group, the mixed vapors of sulfur and selenium giving very satisfactory results and yielding products having excellent qualities as detectors for use in radio telegraphy and radio telephony.

Although the metals which I prefer to use are lead and bismuth, and although the elements of the sulfur group which I prefer to use are sulfur and selenium, other metals such as copper, silver, molybdenum and iron, and many others, may be used in accordance with the principles of my invention, with the production of products having increased rectifying ability. The elements of the sulfur group whch may be used in the practice of my invention are not so numerous. Besides sulfur and selenium I have obtained increased rectifying characteristics by the use of tellurium, but the results are in general much less satisfactory than when sulfur and selenium are used as the active components.

The essential feature of my present invention is the modifying of the current rectifying characteristics of compounds by exposing such compounds to the vapor of one or more elements of the sulfur group at a temperature below the fusing point of the compound. The temperature is of course necessarily above the boiling point of the reagent used, and accordingly the temperature range within which my invention is applicable is the boiling point of the non-metallc component as the lower limit, and the melting point of the rectifying compound as the upper limit. In general, the temperature used should be only slightly below the melting point of the contact rectifying component.

Although I have referred to certain examples as representing specific embodiments, my invention should not be considered as limited to the examples given, and no limitations should be imposed except such as are indicated in the appended claims.

I claim:

1. The process of preparing current rectifying materials which comprises heating a compound of a metal and an element of the sulfur group in the presence of the vapor of an element of the sulfur group.

2. The process of preparing current rectifying materials which comprises heating the compound of a metal and an element of the sulfur group in the presence of vaporized sulfur.

3. The process of preparing current rectifying materials which comprises heating a metallic sulfide in the presence of vaporized sulfur.

4. The process of preparing current rectifying materials which comprises heating lead sulfide in the presence of vaporized sulfur.

In testimony whereof, I have hereunto subscribed my name this 13th day of February, 1923.

WALTER O. SNELLING.